United States Patent [19]

Auvil et al.

[11] Patent Number: 5,207,906
[45] Date of Patent: May 4, 1993

[54] MEMBRANE SEPARATION MODULE

[75] Inventors: Steven R. Auvil, Macungie; James C. Sorensen, Allentown, both of Pa.; Daniel T. Diggs, Florissant, Mo.

[73] Assignee: Permea, Inc., St. Louis, Mo.

[21] Appl. No.: 921,184

[22] Filed: Jul. 28, 1992

[51] Int. Cl.⁵ .............................................. B01D 63/02
[52] U.S. Cl. .......................... 210/321.8; 210/321.89; 210/500.23
[58] Field of Search ........... 210/321.6, 321.72, 321.78, 210/321.79, 321.8, 321.81, 321.87, 321.88, 321.89, 321.9, 500.23

[56]  References Cited
U.S. PATENT DOCUMENTS

| | | | |
|---|---|---|---|
| 3,228,877 | 1/1966 | Mahon | 210/22 |
| 3,422,008 | 1/1969 | McLain | 210/22 |
| 4,045,851 | 9/1977 | Ashare et al. | 29/157 |
| 4,351,092 | 9/1982 | Sebring et al. | 28/100 |

Primary Examiner—Frank Sever
Attorney, Agent, or Firm—Robert J. Wolff; James C. Simmons; Mark L. Rodgers

[57] ABSTRACT

An improved shellside feed, countercurrent flow, hollow fiber membrane separation module is provided wherein one or more flow tubes are incorporated into the conventional design. The flow tubes increase the efficiency of the membrane separation module by reducing undesirable flow patterns that are present in the conventional module.

3 Claims, 3 Drawing Sheets

MEMBRANE SEPARATION MODULE

FIELD OF THE INVENTION

The present invention relates to a countercurrent flow membrane separation module wherein a shellside feed is introduced to a bundle of hollow fiber membranes. The module achieves countercurrent flow between the feed mixture fed to the exteriors (i.e. shellside) of the fibers and the feed components which permeate into the fiber bores.

BACKGROUND OF THE INVENTION

Semipermeable membranes in the form of hollow fibers have been used to separate components in fluid mixtures for many years. Hollow fibers, which can be spun from a wide variety of materials which have suitable membrane separation properties, provide high surface area for contact with the fluid feed mixture. Each component of the feed mixture coming in contact with the membrane material has a characteristic permeation rate that is a function of its ability to dissolve in and diffuse through the membrane material. This enables the separation of the faster permeating components from the slower permeating components. The driving force for the separation is the difference between each component's partial pressure across the inner and outer walls of the hollow fiber.

Large numbers of hollow fibers of similar length are generally grouped together in a bundle in a pressurizable shell or housing in which opposite ends of the fibers are potted and sealed in a material which serves to form a tubesheet at each end, similar in fashion to a shell and tube heat exchanger. One of the tubesheet's potting material is then cut to open the bores of the fibers and thus allow the faster permeating components to pass through this tubesheet into a permeate compartment. The volume within the shell which has access to the exteriors of the fibers (shell side) is effectively sealed by the tubesheets and other peripheral sealing devices from the volumes within the shell which permeate into the fiber bores and subsequently collect in the permeate compartment.

Such devices can be used to separate liquid mixtures or to separate vapors or gases from liquids, but have found particular utility in the separation of gases, such as in air separation to purify nitrogen.

A number of methods for making bundles of hollow fibers suitable for fabrication of membrane modules are taught in the patent literature. For example, U.S. Pat. No. 3,228,877, Mahon (1966), describes the concept of using hollow fibers in a gas separation apparatus. In a subsequent development, U.S. Pat. No. 3,422,008, McLain (1969) discloses a method to wind hollow fibers spirally around a cylinder core. This permits the winding of hollow fibers to form a bundle shape such that the bundle is in an annular form with narrow flow channels which improve fluid flow distribution on the shell side of the fibers. A method to make a coreless annular array of helically wound fibers is described in U.S. Pat. No. 4,045,851 to Ashare, et al. (1977), and another method for making coreless hollow fiber membrane bundles is described in U.S. Pat. No. 4,351,092, Sebring, et al. (1982) wherein the fibers are interlaced with one another in left-hand and right-hand helices at angles to the common axis of rotation of the rotary members which form the fiber bundle. The foregoing disclosures describe modules which are typical and in which the fluid mixture to be separated is exposed to substantially all of the fibers at one time. Modules have been developed, however, in which the fiber bundles are partitioned into sections in order to manipulate the flow distribution of the feed material or of the permeate.

The design of conventional countercurrent flow membrane separation modules wherein a shellside feed is introduced to a bundle of hollow fiber membranes has a deficiency with respect to the flow patterns that develop in the interior of the fiber bundle at both ends of the module. It is the object of the present invention to increase the efficiency of such modules by reducing this deficiency.

SUMMARY OF THE INVENTION

The present invention is an improvement to a conventional countercurrent flow membrane separation module. This conventional module comprises:

a) a housing means containing a fiber bundle which fiber bundle comprises a plurality of individual semipermeable hollow fiber membranes each having a closed end and an open end, the closed ends of which terminate into a first tubesheet and the open ends of which penetrate through a second tubesheet into an adjacent permeate compartment;

b) a feed inlet port in flow communication with the exterior of the fiber bundle at or near the second tubesheet for introducing a feed stream to the housing means such that the feed stream can be separated into a permeate stream and a non-permeate stream which represent those portions of the feed stream which, respectively, have or have not permeated into the interiors of the individual hollow fiber membranes;

c) a permeate outlet port in flow communication with the permeate compartment for withdrawing the permeate stream from the housing means; and d) a non-permeate outlet port in flow communication with the exterior of the fiber bundle at or near the first tubesheet for withdrawing the non-permeate stream from the housing means.

The improvement to the above described conventional module is for increasing the efficiency of the module by modifying its design so that undesirable flow patterns that develop in the interior of the fiber bundle at both ends of the module can be reduced. The improvement comprises one or more flow tubes positioned within the housing means such that one end of each flow tube penetrates one of the tubesheets and partially extends into the interior of the fiber bundle without penetrating into the interiors of the individual hollow fiber membranes.

In a first embodiment of the present invention, the flow tubes comprise a first quantity of flow tubes whose penetrating end penetrates the first tubesheet and which first quantity of flow tubes is in flow communication with the non-permeate outlet port. This permits the withdrawal of at least a portion of the non-permeate stream through the first quantity of flow tubes such that undesirable fluid channeling effects in the interior of the fiber bundle at or near the first tube sheet can be reduced.

In a second embodiment of the present invention, the flow tubes further comprise a second quantity of flow tubes whose penetrating end penetrates the second tubesheet and which second quantity of flow tubes is in flow communication with the feed inlet port. This permits the introduction of at least a portion of the feed stream through the second quantity of flow tubes thereby allowing the feed stream to make better contact with the interior of the fiber bundle at or near the second tubesheet.

DETAILED DESCRIPTION OF THE INVENTION

Figure 1:
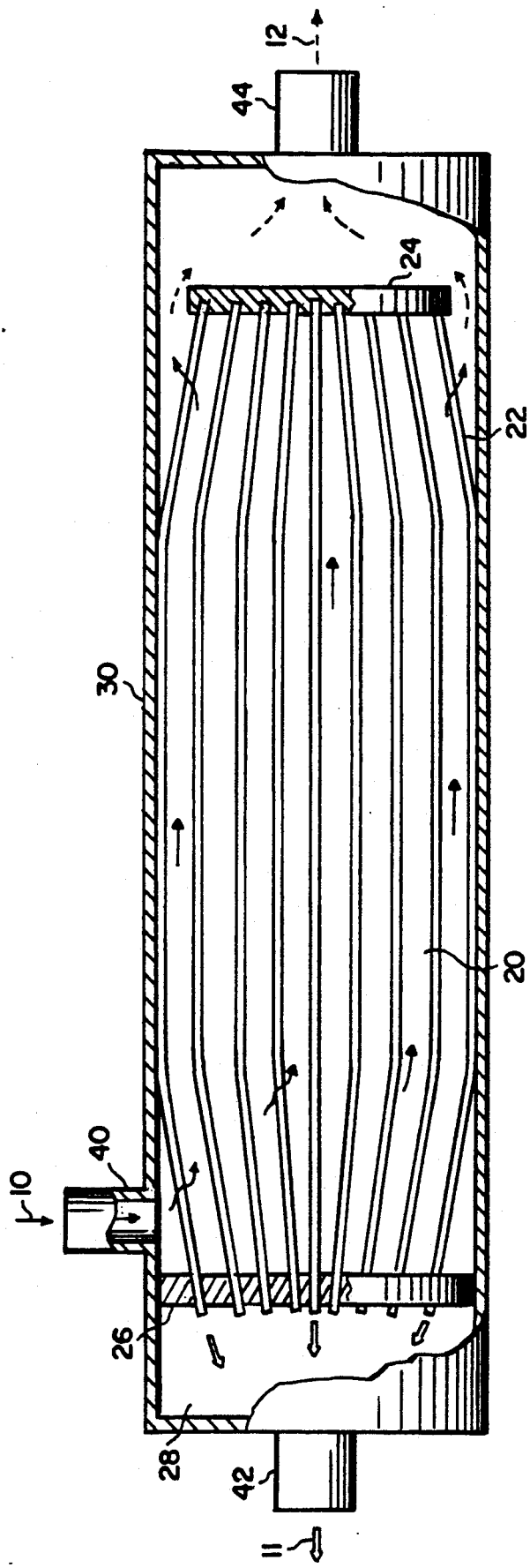
FIG. 1 is a drawing illustrating a typical shellside feed, countercurrent flow, hollow fiber membrane separation module as found in the prior art.

To better understand the present invention, it is important to understand the prior art. As an example, a typical shellside feed, countercurrent flow, hollow fiber membrane separation module is illustrated in FIG. 1. Referring to FIG. 1, a pressurizable shell or housing 30 contains a bundle 20 of individual semi-permeable hollow fiber membranes such as hollow fiber membrane 22. The hollow fiber membrane may be any material which is capable of separating one or more components of the feed stream such as cellulose acetate, polysulfone, polyolefins, silicone rubber and the like. The fiber bundle typically contains thousands of the hollow fiber membranes, each having a closed end and an open end. The closed ends terminate into a first tubesheet 24 while the open ends penetrate through a second tubesheet 26 into an adjacent permeate compartment 28. A feed inlet port 40 is in flow communication with the exterior of fiber bundle 20 at or near second tubesheet 26. This feed inlet port allows for the introduction of a feed stream 10 to housing 30 such that feed stream 10 can be separated into a permeate stream 11 and a non-permeate stream 12 which represent those portions of feed stream 10 which, respectively, have or have not permeated into the interiors of the individual hollow fiber membranes. A permeate outlet port 42 is in flow communication with permeate compartment 28 for withdrawing permeate stream 11 from housing 30. Similarly, a non-permeate outlet port 44 is in flow communication with the exterior of fiber bundle 20 at or near first tubesheet 24 for withdrawing the non-permeate stream from housing 30.

The design of the above described conventional module has a deficiency in that it promotes undesirable flow patterns in the interior of fiber bundle 20 at or near both tubesheets.

The undesirable flow pattern in the interior of fiber bundle 20 at or near first tubesheet 24 is an energy robbing channeling of the non-permeate flow as such flow is forced to abruptly change directions and go around the first tubesheet before exiting the module in non-permeate stream 12. This particular undesirable flow pattern is particularly significant because of the smaller partial pressure driving force for the permeating component at this end of the module.

The undesirable flow pattern in the interior of fiber bundle 20 at or near second tubesheet 26 is best described as the lack of a flow pattern. The flow pattern of feed stream 10 takes it away from second tubesheet 26 toward the opposite end of the module and, as a result, feed stream 10 makes poor contact with the interior of the fiber bundle at or near second tubesheet 26.

The net effect of the above undesirable flow patterns is a loss of effective membrane transfer area in the interior of the fiber at or near both tubesheets. This loss of effective membrane transfer area can lead to a number of problems: the need for additional surface area to perform a given separation, the need to design for lower shellside fluid velocity, an increased difficulty in predicting module performance, or a reduced ability for membranes to handle difficult separations with very low feed-to-permeate partial pressure driving forces.

The present invention is an improvement to the conventional module illustrated in FIG. 1 which reduces the above undesirable flow patterns. The improvement comprises one or more flow tubes positioned within the housing means such that one end of each flow tube penetrates one of the tubesheets and partially extends into the interior of the fiber bundle without penetrating into the interiors of the individual hollow fiber membranes.

Figure 2:
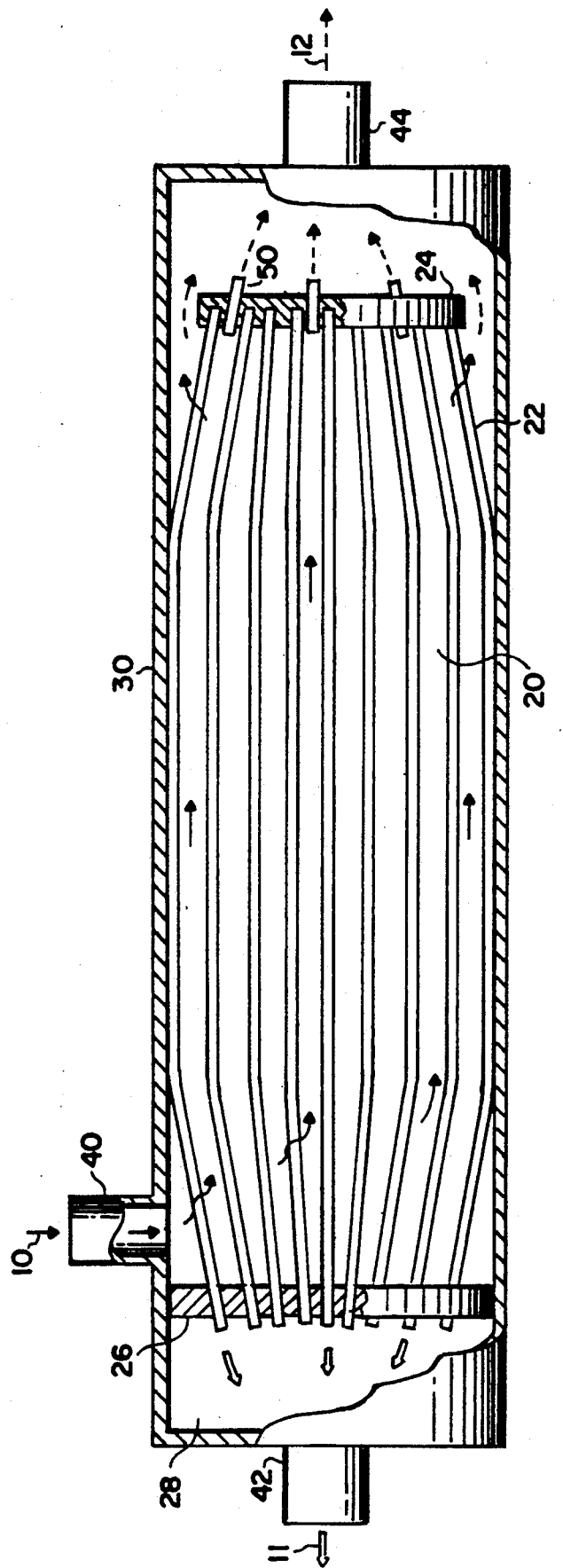
FIG. 2 is a drawing illustrating a first embodiment of the present invention.

A first embodiment of the present invention will now be illustrated with reference to FIG. 2. Except for incorporation of this first embodiment, the module illustrated in FIG. 2 is identical to the module illustrated in FIG. 1 (similar features of the FIG. 2 module utilize common numbering with the FIG. 1 module). This first embodiment comprises one or more flow tubes (such as flow tube 50) which penetrate first tubesheet 24 and partially extend into the interior of fiber bundle 20 without penetrating into the interiors of the individual hollow fiber membranes. These flow tubes are in flow communication with non-permeate outlet port 44 to permit the withdrawal of at least a portion of non-permeate stream 12 through such flow tubes such that undesirable fluid channeling effects in the interior of fiber bundle 20 at or near first tube sheet 24 can be reduced.

Figure 3:
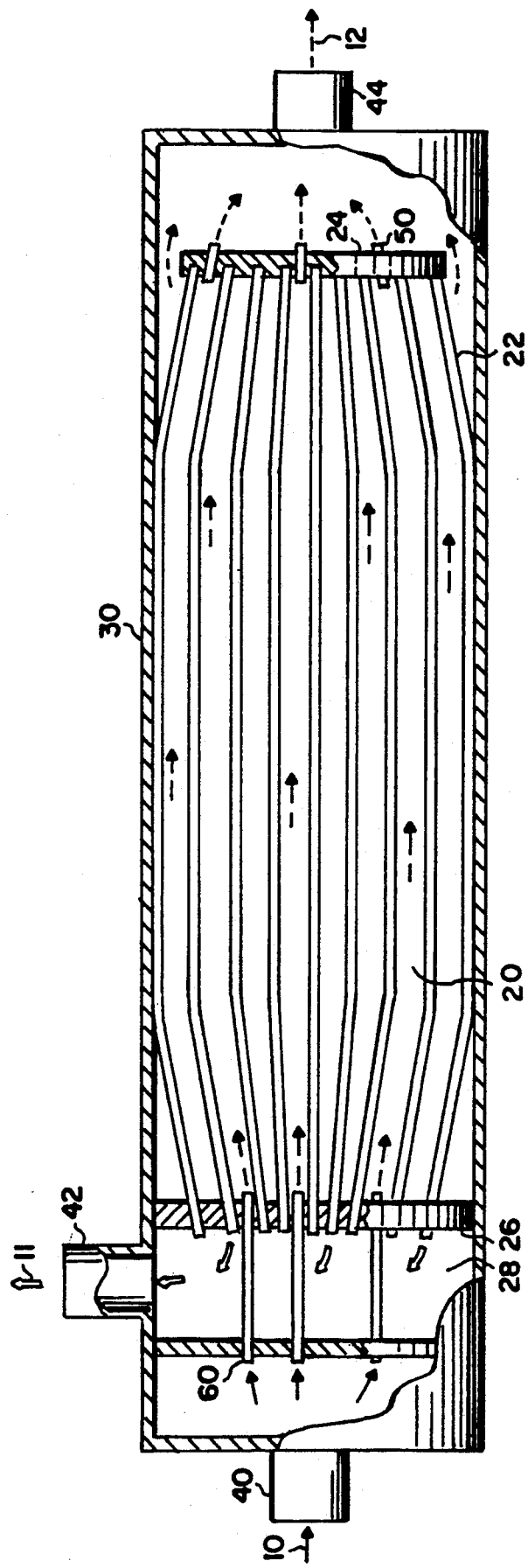
FIG. 3 is a drawing illustrating a second embodiment of the present invention.

A second embodiment of the present invention will now be illustrated with reference to FIG. 3. Except for incorporation of this second embodiment, the module illustrated in FIG. 3 is identical to the module illustrated in FIG. 1 (similar features of the FIG. 3 module utilize common numbering with the FIG. 1 module). In addition to the one or more flow tubes of the first embodiment described above, this second embodiment further comprises a second quantity of one or more flow tubes (such as flow tube 60) which extend through permeate compartment 28, penetrate second tubesheet 26 and partially extend into the interior of fiber bundle 20 without penetrating into the interiors of the individual hollow fiber membranes. This second quantity of flow tubes is in flow communication with feed inlet port 42 to permit the introduction of at least a portion feed stream 10 through such flow tubes thereby allowing feed stream 10 to make better contact with the interior of fiber bundle 20 at or near second tubesheet 26.

It should be noted that the above described flow tubes may be machined directly into the respective tubesheet. Further, this machining may be such that the length of the flow tube is basically equal to the width of the respective tubesheet. In this scenario, the flow tube essentially becomes a hole or opening in the respective tubesheet.

The present invention has been described with reference to two specific embodiments thereof. These embodiments should not be viewed as limitations to the present invention, the scope of which should be ascertained by the following claims.

We claim:

1. In a countercurrent flow membrane separation module comprising:

a) a housing means containing a fiber bundle which fiber bundle comprises a plurality of individual semi-pereable hollow fiber membranes each having a closed end and an open end, the closed ends of which terminate into a first tubesheet and the open ends of which penetrate through a second tubesheet into an adjacent permeate compartment;

b) a feed inlet port in flow communication with the exterior of the fiber bundle at or near the second tubesheet for introducing a feed stream to the housing means such that the feed stream can be separated into a permeate stream and a non-permeate stream which represent those portions of the feed stream which, respectively, have or have not permeated into the interiors of the individual hollow fiber membranes;

c) a permeate outlet port in flow communication with the permeate compartment for withdrawing the permeate stream from the housing means; and d) a non-permeate outlet port in flow communication with the exterior of the fiber bundle at or near the first tubesheet for withdrawing the non-permeate stream from the housing means;

the improvement for increasing the efficiency of said membrane separation module comprising: means for reducing the undesirable fluid channeling effects in the interior of the fiber bundle at or near the first and/or second tube sheet, further comprising one or more flow tubes positioned within the housing means such that one end of each flow tube penetrates one of the tubesheets and partially extends into the interior of the fiber bundle without penetrating into the interiors of the individual hollow fiber membranes.

2. The membrane separation module of claim 1 wherein the flow tubes comprise a first quantity of flow tubes that penetrate the first tube sheet and wherein the first quantity of flow tubes is in flow communication with the non-permeate outlet port to permit the withdrawal of at least a portion of the non-permeate stream through the first quantity of flow tubes such that undesirable fluid channeling effects in the interior of the fiber bundle at or near the first tube sheet reduced.

3. The membrane separation module of claim 2 wherein the flow tubes further comprise a second quantity of flow tubes that penetrate the second tube sheet and also extend through the permeate compartment and wherein the second quantity of flow tubes is in flow communication with the feed inlet port to permit the introduction of at least a portion of the feed stream through the second quantity of flow tubes thereby allowing the feed stream to make better contact with the interior of the fiber bundle at or near the second tubesheet.

* * * * *